April 12, 1932.  A. B. F. G. RICHARDSON  1,853,227
APPARATUS FOR TWISTING WIRES TOGETHER
Filed Feb. 13, 1931  6 Sheets-Sheet 1

INVENTOR
Arthur B. F. G. Richardson
BY
Byrnes, Stebbins, Parmelee & Blenko
ATTORNEY

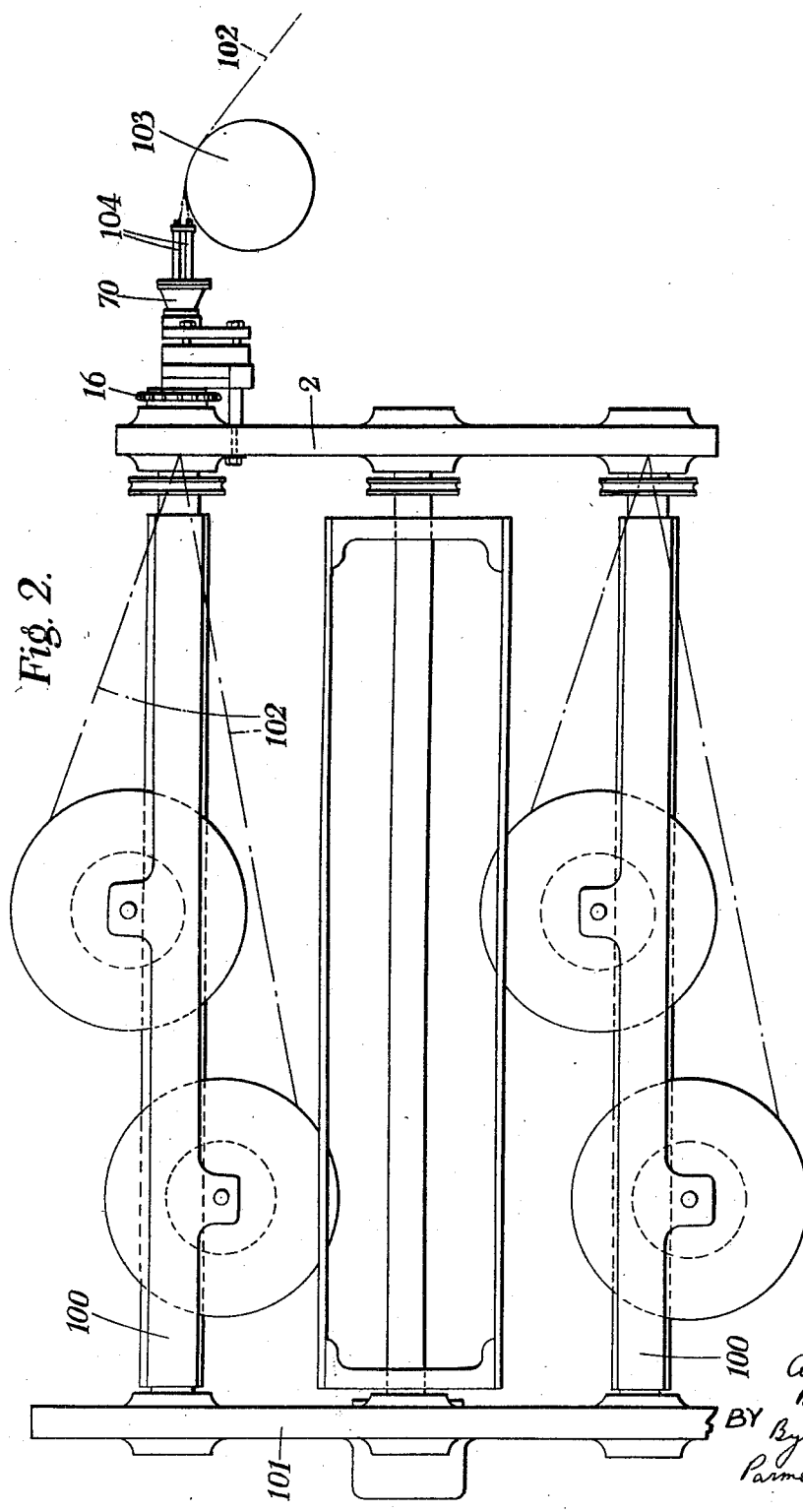

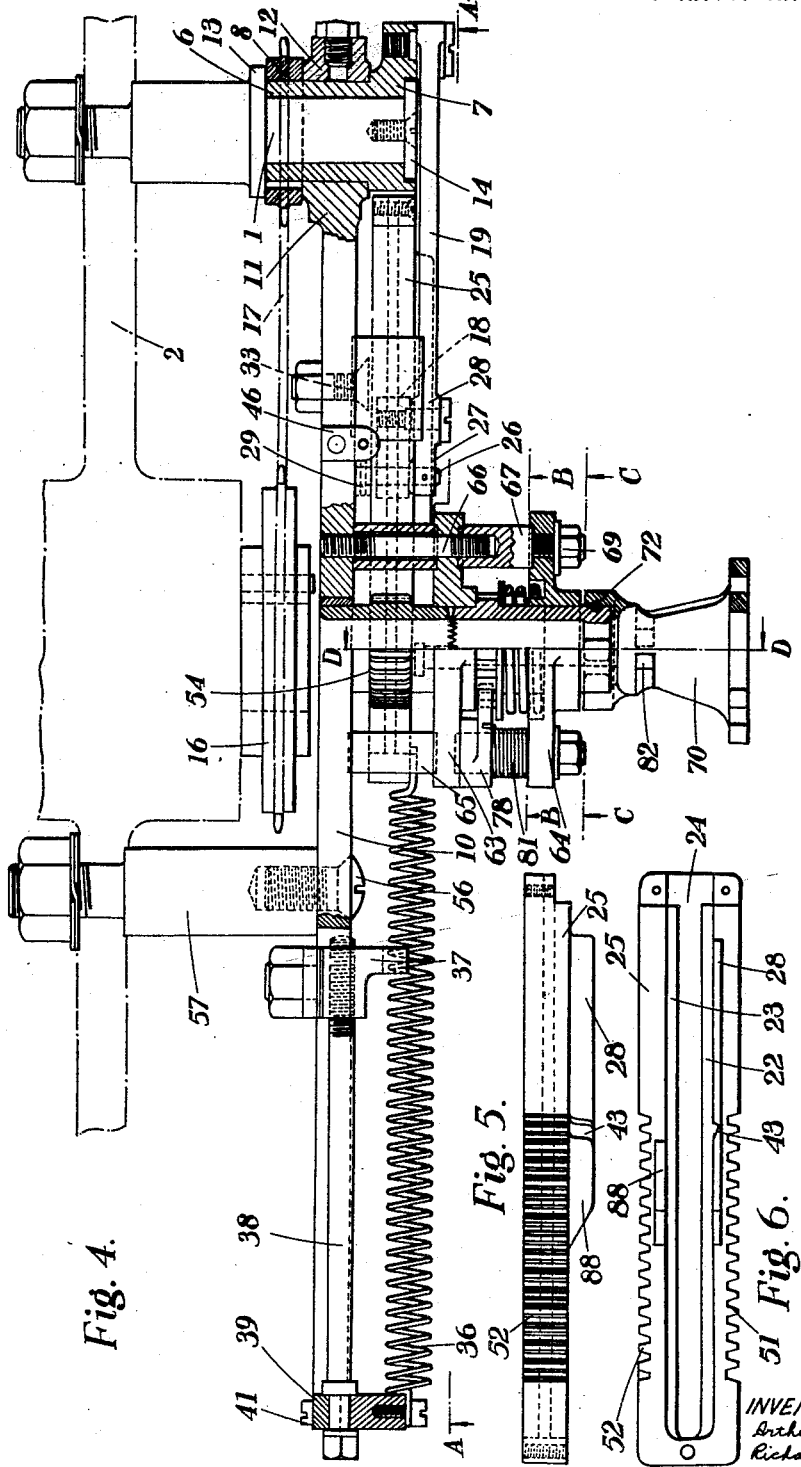

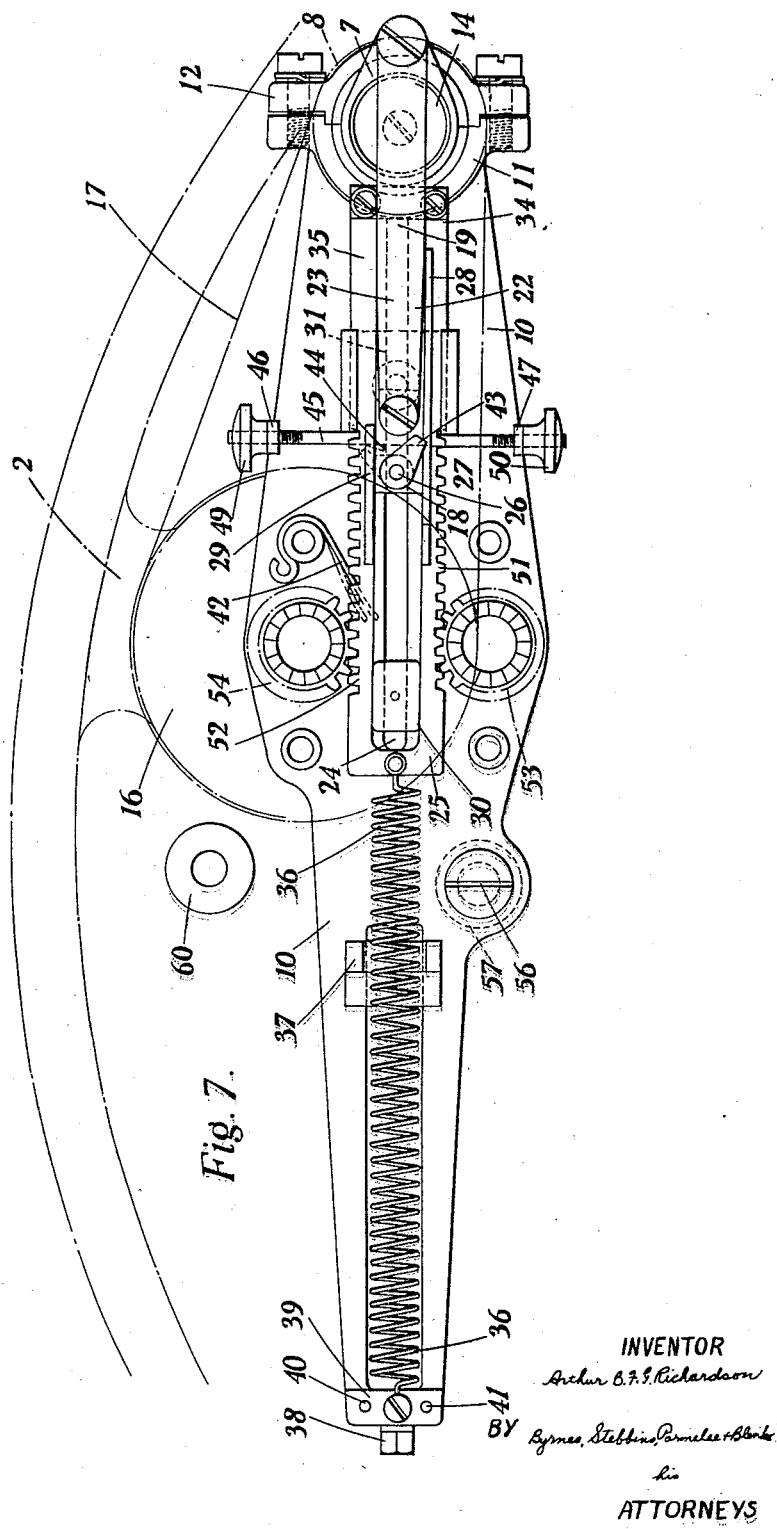

April 12, 1932.  A. B. F. G. RICHARDSON  1,853,227
APPARATUS FOR TWISTING WIRES TOGETHER
Filed Feb. 13, 1931  6 Sheets-Sheet 5

INVENTOR
Arthur B. F. G. Richardson
BY Byrnes, Stebbins,
Parmelee & Blenko
ATTORNEYS April 12, 1932.   A. B. F. G. RICHARDSON   1,853,227
APPARATUS FOR TWISTING WIRES TOGETHER
Filed Feb. 13, 1931    6 Sheets-Sheet 6
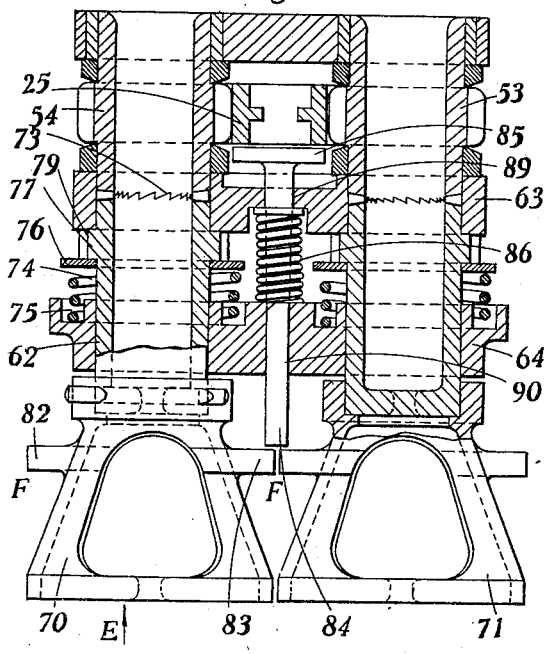
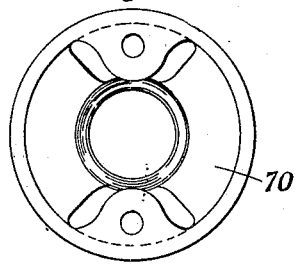
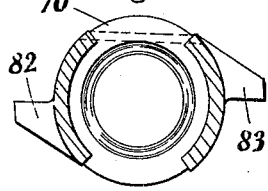
INVENTOR
Arthur B. F. G. Richardson
BY
Byrnes, Stebbins, Parmelee & Blenko
ATTORNEYS Patented Apr. 12, 1932

1,853,227

UNITED STATES PATENT OFFICE

ARTHUR BRUCE FRASER GILLESPIE RICHARDSON, OF BELVEDERE, KENT, ENGLAND

APPARATUS FOR TWISTING WIRES TOGETHER

Application filed February 13, 1931, Serial No. 515,574, and in Great Britain February 22, 1930.

This invention relates to apparatus for twisting together wires in pairs and it deals particularly with cases where it is required to vary the relative positions of the wires of a pair in sudden, separate steps as distinguished from the gradual transposition produced by a uniform spiral twisting action. The object of the invention is to provide an improved form of apparatus for effecting the rapid changes of the relative positions of the wires.

In machines to which the present invention is applicable the wires to be twisted together are fed forward to a guide member and pass through this member and from it to and past a point, which is a relatively short distance in front thereof, and at which the relative rotation of the wires is terminated. Before reaching the guide member the wires are given a uniform rate of rotation about an axis. After passing the guide member the wires are given a step by step rotary movement of an equivalent total angular extent to that of the uniform movement. In mechanism embodying the present invention this step by step rotary movement is brought about as follows.

A gearing member (for instance a rack, segment or wheel) is drawn forward relatively slowly and then allowed to fly back quickly when released under the influence of some applied force, for instance a spring. This member is arranged to have a one-way drive to the guide member so as to transmit to this member a rotation through 180° during the quick return, but leave the guide member sationary during the slow forward movement. This quick step by step drive is preferably combined with a stop mechanism to prevent the guide member from over-running. This mechanism can be caused to be moved into position by the gearing member as it approaches the end of the return stroke and the force necessary to move the stop mechanism into position may act to reduce the speed of movement of the gearing member which will be finally brought to rest by an appropriate stop or buffer.

The invention is particularly applicable to the twinning or quadding of wires for telephone cables. It is illustrated by way of example in the accompanying drawings in which it is shown applied to the twinning of a pair of wires. In these drawings Figure 1 indicates diagrammatically the form of twisting obtained by the invention.

Figure 2 shows in side elevation the relevant parts of a quadding machine.

Figure 4 is a plan, in part section of the mechanism for producing the sudden twisting of a pair of wires.

Figures 5 and 6 are respectively plan and elevation of the gearing member, in this case a rack.

Figure 7 is an elevation on the line A—A of Figure 4 and looking in the direction of the arrows.

Figure 11 is a sectional elevation on the line D—D of Figure 4 and looking in the direction of the arrows.

Figure 12 is an elevation of one of the guide members looking in the direction of the arrow E in Figure 11.

Figure 13 is a sectional elevation of the same guide member, also looking in the direction of the arrow E, and taken on the line F—F in Figure 11.

Figure 1:
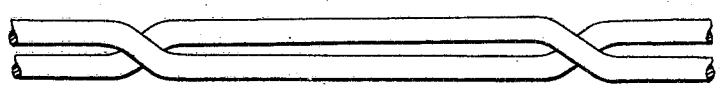
Figure 3:
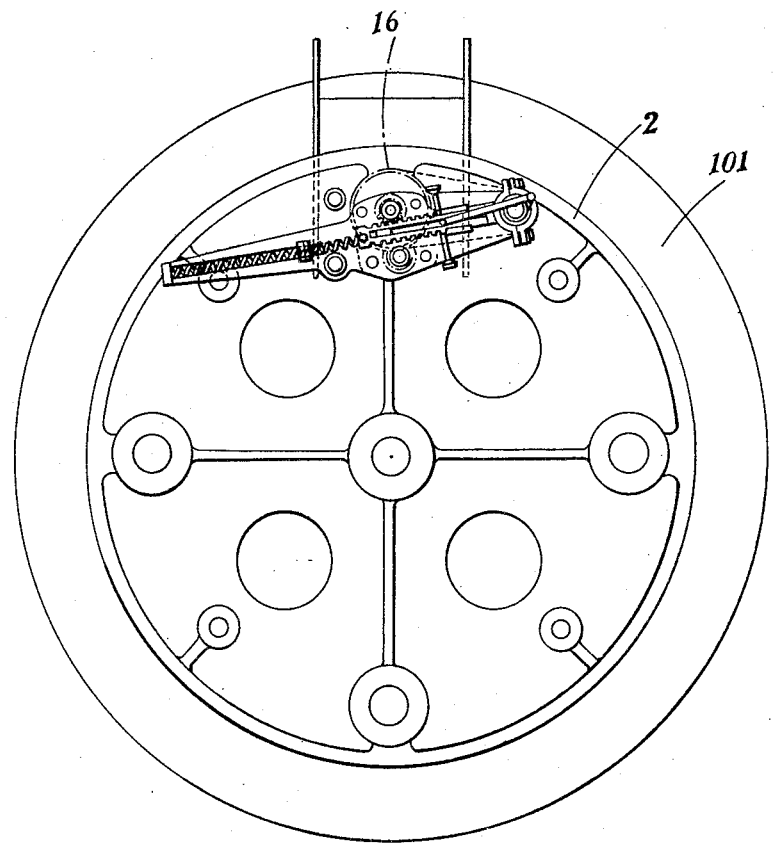
Figure 3 shows an end elevation of this machine corresponding to Figure 2 with certain parts omitted.

In twisting together a pair of wires in accordance with the method to which the present invention relates a disposition of the wires similar to that indicated in Figure 1 results. From that figure it will be seen that the wires run parallel with each other for the greater part of their length, but at intervals are given sudden twisting movements by which they cross over each other and arrive at positions parallel with their original positions but displaced through 180° relative thereto about the axis of the pair of wires.

In Figure 2 is shown the bobbin carriage of a machine which contains two frames 100, each of which carries two bobbins. The whole carriage with its four bobbins provides for the production of a quad consisting of four wires appropriately twisted together. As the invention is only concerned with what happens to a single pair of wires before they are associated with the other pair attention will be confined to the upper frame 100 and the twisting mechanism is only illustrated in connection with that frame. The whole carriage rotates about its central longitudinal axis, but since the whole of the mechanism to which the invention relates takes part in that rotation, the rotation can be considered as having no influence on the mechanism per se. Accordingly this rotation will be disregarded in the description of the mechanism. The carriage comprises a pair of end members 101 and 2 between which each frame 100 is supported in bearings. The mechanism for rotating the frame continuously at a uniform speed is mounted on the rear end member 101. It is not shown in the drawings. The front end of the frame 100 has a hollow bearing member working in the bearing in the end plate 2 and through it the two wires 102 pass to the twisting mechanism. This bearing member extends beyond the front end plate 2 to a short distance and carries there a chain wheel 16 which will be hereinafter referred to.

The two wires 102 as shown in Figure 2 pass through a guide member 70 and round a draw-off pulley 103 and are then drawn-off to some other mechanism or are wound on to a bobbin according to the further treatment to be given to them outside the scope of the present invention. As previously indicated the rotation of the frame 100 takes place continuously and accordingly the parts of the wires 102 which are coming off those bobbins are also rotated continuously about the axis of the frame 100. At the point where the two wires come on to the draw-off pulley 103 all rotation about this axis is stopped. The momentary rate of rotation of the wires 102 is controlled by the guide member 70 which by mechanism to be hereinafter described is given sudden rotations through 180° followed by stationary periods. The total sum of these angular movements of the guide member 70 is equal to the sum of the angular movements of the frame 100 in the same time. Accordingly the continuous rotation of the wires 102 at the bobbins in the frame 100 is translated into a step by step rotation between the guide member 70 and the take-up pulley 103 thus resulting in the step by step type of twisting shown in Figure 1.

The mechanism by which this result is obtained will now be described.

A bearing pillar 1 is firmly fastened to the member 2 of a wire-twinning or quadding machine, in conjunction with which the mechanism is to be used. The bearing pillar 1 carries a bearing 6 which is formed at one end into a crank 7 and has at the other end a toothed chain wheel 8 keyed on it. The frame or foundation 10 of the mechanism is formed at one end into a bearing block 11 to which is attached a bearing cap 12; the bearing 6 turns freely within the bearing block and upon the bearing pillar 1, being registered between a fixed collar 13 and a washer 14 fastened to the end of the bearing pillar.

A second chain wheel 16, the axis of which coincides with the horizontal path of the pair of wires to be twisted, rotates at a speed equal to that of the mean speed of rotation of the wires. The chain wheel 8 is driven from the chain wheel 16 by means of a chain drive 17, the gear ratio being such that the speed of rotation of the former is exactly twice that of the latter. By virtue of the connection previously explained the crank 7 rotates at the same speed as the chain wheel 8. This rotation is transmitted to a cross-head 18 by a connecting rod 19. The cross-head 18 is provided with two grooves enabling it to move freely along two guides 22 and 23 within a slot 24 in a rack 25. A spindle 26, carried by and free to turn within the cross-head 18, carries a catch 27 which rides upon the projecting wall 28 of the rack 25, and a tail catch 29; the two catches 27 and 29 are rigidly fixed to the spindle 26 so that they move as one member.

The path of the rack 25 is regulated by two guiding pieces 30 and 31 fastened to the frame 10; the guide 30 engages with the inner guide faces 22 and 23, while the guide 31 engages with the outer guide faces 34 and 35. When at rest the rack 25 is held by a helical spring 36 against a stop 37 the position of which is adjustable by means of an adjusting screw 38; the head of the adjusting screw 38 is housed in a bearing piece 39 fastened by two set screws 40 and 41 to the one end of the frame 10, which bearing piece also acts as an anchorage for the helical spring 36.

Figure 8:
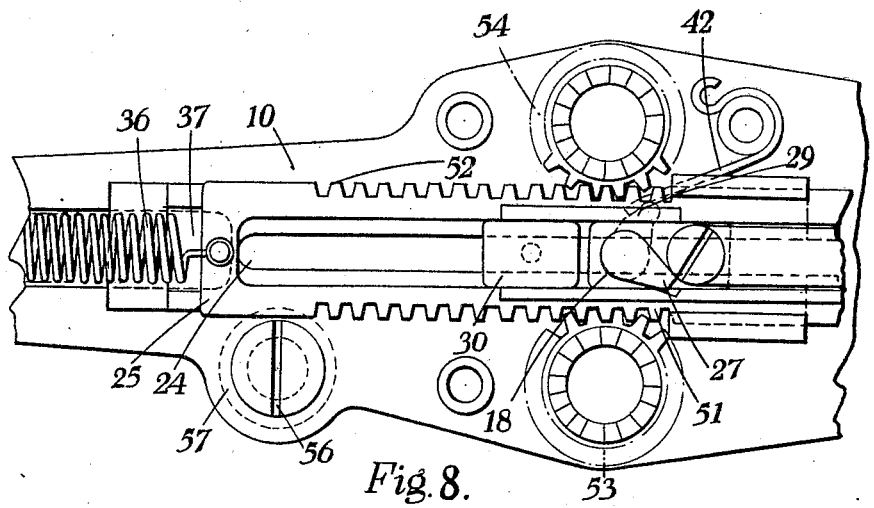
Figure 8 is a further view of part of Figure 7, the relative positions of the moving parts being altered.

Considering the rack 25 to be in this position of rest (see Figure 8), a complete cycle of operations is obtained in the following manner. The connecting rod, starting from the position indicated in Figure 7, moves towards the left-hand side of the figure to the position shown in Figure 8, and near the end of its stroke the tail catch 29 is pressed against a biasing spring 42. At the beginning of the return stroke, due to the force exerted by the spring 42, the catch 27 engages with a notch 43 in the projecting wall 28 of the rack. Due to this engagement the connecting rod 19 draws the rack 25 against the pull of the spring 36 during the return stroke; this is the idle stroke of the rack. At a certain predetermined position, shown in Figure 7, the tail catch 29 comes into contact with an inclined face 44 causing it to turn about the spindle 26 thereby lifting the catch 27 out of the notch 43; the rack 25, being released, moves rapidly back to its original position against the stop 37 under the action of the spring 36, this is the working stroke of the rack. The inclined face or cam 44 is incorporated with a spindle 45 which is held in position by two eye bearings 46 and 47 fastened to the frame 10; the spindle 45 is threaded at each end to receive the finger nuts 49 and 50 by means of which it may be moved transversely to the direction of movement of the rack 25, thus providing the fine adjustment of the exact instant at which the tail catch 29 is rotated sufficiently to release the catch 27 from the notch 43.

As shown in Figure 7 the rack 25 has two sets of teeth 51 and 52 in mesh with two annular pinions 53 and 54 which rotate in opposite directions and are connected to the guide members 71 and 70 by a free wheel mechanism so that the guide members are rotated by the working stroke only. The length of the stroke of the rack 25 is so regulated by means of the adjustable stop 37 and the inclined face or cam 44 that the annular pinions 53 and 54 are turned through exactly 180° for each working stroke. Figure 7 illustrates the position of the mechanism with reference to the main machine frame 2 which enables a pair of wires passing along the axis of the annular pinion 54 to be given a right hand twist during the working stroke of the rack 25. The mechanism is held in this position by a set screw 56 which fastens the frame 10 to a pillar 57 attached to the main machine frame 2. In order to obtain a left hand twist the set screw 56 is removed and the mechanism is rotated bodily about the axis of the bearing 6 into a position which enables the set screw 56 to be screwed into a second pillar 60, this second pillar 60 being exactly similar to the first pillar 57. The new position brings the annular pinion 53 into the original position of the annular pinion 54 coinciding with the axis of the pair of wires to be twisted.

Figure 9:
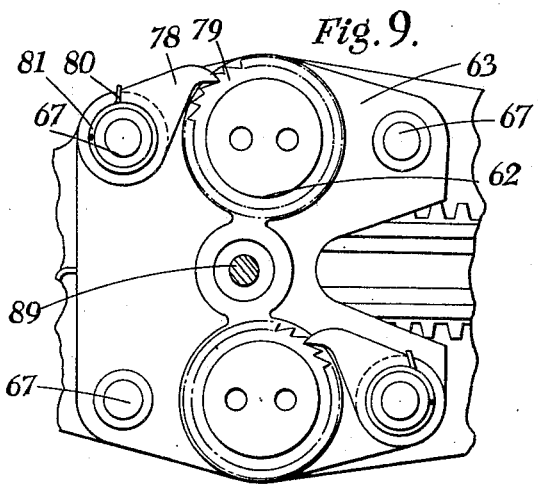
Figure 9 is an elevation on the line B—B of Figure 4 looking in the direction of the arrows.
Figure 10:
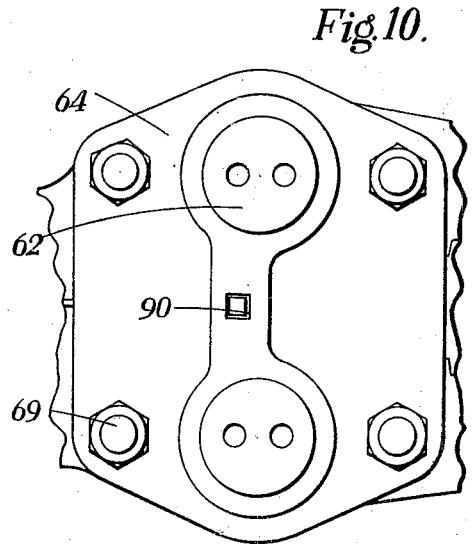
Figure 10 is an elevation on the line C—C of Figure 4 and looking in the direction of the arrows.

The one-way drives to the guide members 70 and 71 are supported within the bottom housing 63, shown in elevation by Figure 9, and the top housing 64, similarly shown in Figure 10. The bottom housing 63 is kept in position relative to the frame 10 by four spacing tubes 65 through which pass four studs 66. Four special studs 67, being internally threaded to receive the studs 66, serve to hold the bottom housing 63 firmly against the spacing tubes 65 and also support the top housing 64 which is held thereon by four nuts and washers 69. Since the operation of the one-way drives to both the guide members 70 and 71 is the same in both cases, a detailed description is given of the drive to the guide member 70 only, with reference to Figures 4, 9 and 11. The guide member 70 is attached to the hollow die 62 by a tapered pin 72. The engaging faces of the die 62 and the pinion 54 are provided with ratchet teeth 73 which are so formed that they will ride over one another in one direction but become firmly engaged when operated in the other direction. A spring 74 seated in a circular groove 75 in the top housing 64 presses against a bearing collar 76 which bears upon an annular projection 77 and ensures that the ratchet teeth 73 engage during the working stroke; during the idle stroke the spring 74 allows sufficient lateral movement of the die 62 to allow the teeth to ride over each other. A pawl 78 is pivoted upon one of the studs 67 and engages with a set of ratchet teeth 79 formed around the periphery of the annular projection 77 being held in contact with the teeth by the projecting end 80 of a helical spring 81; the pawl allows the teeth to turn during the working stroke but positively prevents any return motion of the guide members during the idle stroke.

As previously explained the length of travel of the rack 25 is so regulated that the guide member turns through 180° for every working stroke. To prevent any tendency for the guide member to over-run this amount it is provided with two projections 82 and 83 diametrically opposite to each other and a stop 84 is automatically operated near the end of the working stroke so that it engages with the projections on both guide members.

The head 85 of the stop 84 is held by a spring 86 against the face of the rack 25; in this position the end of the stop is just clear of the path of the projections 82 and 83 as shown in Figure 11. Projecting pieces 28 and 88 are formed upon the face of the rack so that towards the end of the working stroke the stop is pushed against the action of the spring 86 and engages with the projections upon the guide members. The stop 84 works in guide bearings 89 and 90 incorporated in the top and bottom housings.

The addition of a second guide member entails very little addition to the mass of the moving parts since both members are operated by a common drive and are positively prevented from over-running by a common controlling stop.

The wires of the pair to be twisted in the mechanism just described are brought to the guide member 70 or 71 (whichever is in use) from a pair of bobbins rotated in a frame 100 so as to turn continuously about an axis forming an extension of the axis of rotation of the guide member. This rotation takes place at the same speed as the rotation of the chain wheel 16. The wires are threaded through an aperture in the wheel 16 and its support and pass thence through the tube formed within the mechanism and through a pair of tubes 104 mounted on the guide member and on to a draw-off wheel 103 (Figure 2) at which the twisting of the wires ceases.

What I claim as my invention and desire to secure by Letters Patent is:—

1. Apparatus for twisting together wires in pairs in sudden separate steps of twisting, comprising a guide member for the wires, means for drawing forward the wires through said member and means for rotating said member with a step by step movement, said rotating means comprising a gearing member, means for drawing forward said member relatively slowly, means for returning said member quickly and a one-way driving connection between the said gearing member and said guide mmeber operative during the return movement of the former.

2. Apparatus for twisting together wires in pairs in sudden separate steps of twisting, comprising a guide member for the wires, means for drawing forward the wires through said member and means for rotating said member with a step by step movement, said rotating means comprising a gearing member, means for drawing forward said member relatively slowly, means for returning said member quickly and a one-way driving connection between the said gearing member and said guide member operative during the return movement of the former and producing the rotation of the guide member through 180° at each such movement.

3. Apparatus for twisting together wires in pairs in sudden separate steps of twisting, comprising a guide member for the wires, means for drawing forward the wires through said member, means for rotating said member with a step by step movement, said roating means comprising a gearing member, means for drawing forward said member relatively slowly, means for returning said member quickly and a one-way driving connection between the said gearing member and said guide member operative during the return movement of the former, and an automatic stop mechanism preventing overrunning of said guide member.

4. Apparatus for twisting together wires in pairs in sudden separate steps of twisting, comprising a guide member for the wires, means for drawing forward the wires through said member, means for rotating said member with a step by step movement, said rotating means comprising a gearing member, means for drawing forward said member relatively slowly, means for returning said member quickly and a one-way driving connection between the said gearing member and said guide member operative during the return movement of the former, and an automatic stop mechanism preventing overrunning of said guide member, said mechanism being actuated by the gearing member as it approaches the end of the return stroke.

5. Apparatus for twisting together wires in pairs in sudden separate steps of twisting, comprising two guide members for the wires, means for drawing forward the wires through either one of said members, means for rotating said members with a step by step movement, said rotating means comprising a double faced rack, means for drawing forward said rack relatively slowly, means for returning said rack quickly, a pinion on each side of said rack and a one-way driving connection between each said pinion and one of the guide members for the wires, and a movable frame carrying said rack and pinions and guide members and permitting either of the two guide members to be brought into operative position according as a right hand or a left hand twisting of the wires is required.

6. Apparatus for twisting together wires in pairs in sudden separate steps of twisting, comprising a guide member for the wires, means for drawing forward the wires through said member and means for rotating said member with a step by step movement, said rotating means comprising a gearing member, a crank and a connecting rod, a catch mounted on said rod and engaging said gearing member near the commencement of the forward stroke of the crank, means for releasing this engagement near the end of the forward stroke, means for returning the gearing member quickly and a one-way driving connection between said gearing member and said guide member operative during the return movement of the former.

In testimony whereof I affix my signature.

ARTHUR BRUCE FRASER GILLESPIE RICHARDSON.